United States Patent
Sawdon

(10) Patent No.: US 8,242,059 B2
(45) Date of Patent: Aug. 14, 2012

(54) WELLBORE FLUID

(75) Inventor: Christopher Alan Sawdon, Par (GB)

(73) Assignee: BP Exploration Operating Company Limited, Middlesex (GB)

(*) Notice: Subject to any disclaimer, the term of this patent is extended or adjusted under 35 U.S.C. 154(b) by 167 days.

(21) Appl. No.: 12/734,033

(22) PCT Filed: Sep. 24, 2008

(86) PCT No.: PCT/GB2008/003233
§ 371 (c)(1),
(2), (4) Date: Apr. 6, 2010

(87) PCT Pub. No.: WO2009/047478
PCT Pub. Date: Apr. 16, 2009

(65) Prior Publication Data
US 2010/0248996 A1    Sep. 30, 2010

(30) Foreign Application Priority Data
Oct. 9, 2007 (EP) .................................. 07253994

(51) Int. Cl.
*C09K 8/68* (2006.01)
*C09K 8/06* (2006.01)
*C09K 8/504* (2006.01)
*E21B 43/22* (2006.01)

(52) U.S. Cl. ........ 507/203; 507/136; 507/276; 507/927; 507/937; 166/270.2

(58) Field of Classification Search ............ 507/100, 507/136, 276, 927, 937, 203; 166/270.2
See application file for complete search history.

(56) References Cited

U.S. PATENT DOCUMENTS
6,787,505 B1* 9/2004 Maitland et al. ............... 507/103
6,793,025 B2* 9/2004 Patel et al. ...................... 175/50

FOREIGN PATENT DOCUMENTS
WO    WO 99/14285        3/1999
WO    WO 03/106587      12/2003
WO    WO 2007088322 A1 * 8/2007

OTHER PUBLICATIONS
International Search Report for PCT/GB2008/003233, mailed Nov. 21, 2008.
Written Opinion of the International Searching Authority for PCT/GB2008/003233, mailed Nov. 21, 2008.

* cited by examiner

*Primary Examiner* — Ling Choi
*Assistant Examiner* — Aiqun Li
(74) *Attorney, Agent, or Firm* — Nixon & Vanderhye

(57) ABSTRACT

Oil-based wellbore fluid in the form of an emulsion having a continuous phase containing an oil and, dispersed therein, a first dispersed liquid phase and a second separate dispersed liquid phase. The first dispersed liquid phase is a brine phase containing at least 5% by weight of a dissolved salt or a mixture of salts, and the second dispersed liquid phase is a polar organic liquid which is insoluble or sparingly soluble in the brine and contains the first dispersed liquid phase, but is soluble in pure water. The second dispersed liquid phase is in the form of droplets having an average diameter of not less than 5 microns.

23 Claims, 3 Drawing Sheets

FAZEPRO reversible OBM – Effect of Glydril LC on Seawater Breakthrough

Key:
- ......... pressure
- ——— Base Mud (BM)
- – – – BM + 14ppb Glydril LC

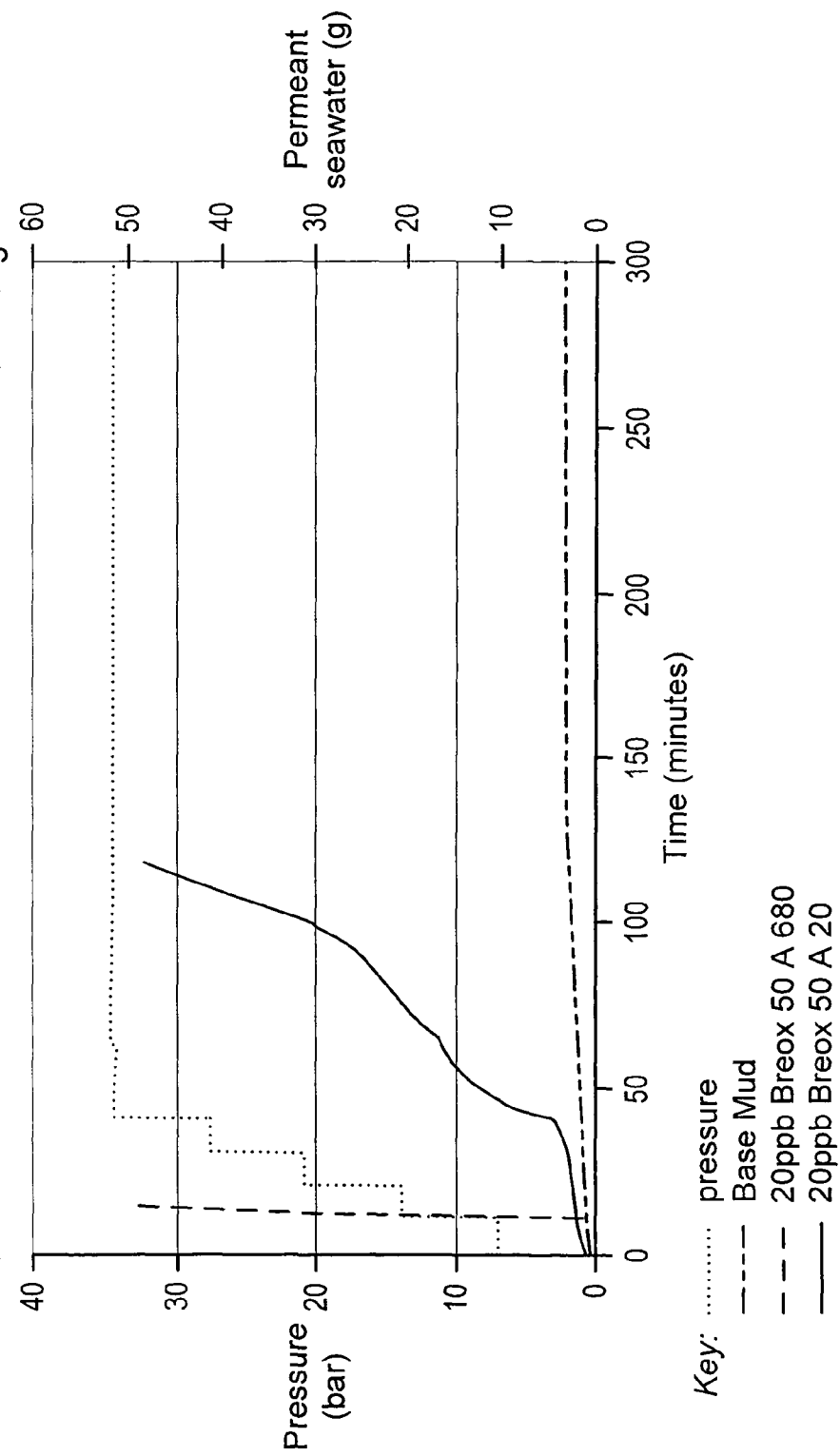

WELLBORE FLUID

This application is the U.S. national phase of International Application No. PCT/GB2008/003233 filed 24 Sep. 2008, which designated the U.S. and claims priority to EP Application No. 07253994.3 filed 9 Oct. 2007, the entire contents of each of which are hereby incorporated by reference.

The present invention relates to oil-based wellbore fluids having utility in the construction, repair or treatment of a wellbore, and to the removal of the barrier to fluid flow caused by the filter-cake deposited by the wellbore fluids on or in rock formations penetrated by the wellbore.

BACKGROUND OF THE INVENTION

Conventionally, the drilling of a well into the earth by rotary drilling techniques, involves the circulation of a drilling fluid from the surface of the earth down a drill string having a drill bit on the lower end thereof and through ports provided in the drill bit to the well bottom and thence back to the surface through the annulus formed about the drill string. The drilling fluid serves to cool the drill bit, to transport drill cuttings to the surface, and to stabilize the wellbore.

Wells such as oil, gas or water injection wells are frequently drilled or completed using oil-based wellbore fluids, that is, fluids having a continuous oil phase. Such fluids are often referred to as oil-based muds. Oil-based muds usually contain a brine phase dispersed in the continuous oil phase, water-in-oil emulsifiers, dispersed solid particles such as barite and calcium carbonate, and oil-wetting agents to maintain such particles in an oil-wet condition. They also frequently contain dissolved or colloidally-dispersed polymers or resins such as gilsonite, blown asphalt, vinyl toluene/alkyl acrylate copolymers or amine-treated lignite. These dissolved or colloidally dispersed materials act to reduce the filtration rate of the wellbore fluid. As well as finding application as drilling fluids, such fluids can also be used as completion or workover fluids.

When drilling a permeable rock formation such as a hydrocarbon producing formation or an interval intended for water injection (e.g. seawater injection), the hydrostatic pressure in the well is maintained higher than the natural pressure of fluids inside the permeable rock in order to prevent a flow of formation fluids into the well. This differential pressure causes filtration of the drilling fluid such that a substantially all-oil filtrate is forced into the permeable rock. The dispersed particles such as oil-wet barite are generally too large to enter the pores of the formation, and so they are deposited on the wellbore wall as a filter-cake. The oil-wet particles pack together in the filter-cake under the applied differential pressure, and the strongly emulsified brine emulsion droplets become trapped in the pores between the solid particles. Because the brine is a non-wetting phase the droplets cannot readily be forced through the pore throats, thus plugging the pore throats and substantially reducing the permeability of the filter-cake. The filter-cake permeability is yet further reduced by the accumulation of dissolved or colloidally-dispersed polymers or resins sealing the pore passages.

During drilling, the very low permeability filter-cake fulfils the valuable function of limiting losses of filtrate to the formation, and avoids problems such as differential sticking of the drillstring. Unfortunately the low permeability filter-cake can later form a barrier to the production of hydrocarbons, or to the injection of seawater, especially if it becomes trapped between the formation and the expanded screens or gravel packs that are commonly used to limit sand invasion into the wellbore. The problem is particularly acute in the case of seawater injection wells for two reasons. Firstly, the injected water pressure forces the filter-cake onto the rock surface, which can consolidate the seal. Secondly, oil-based mud filter-cakes are persistently oil-wet, which makes the penetration of seawater into and through the filter-cake during subsequent operations very difficult.

Accordingly the industry has employed filter-cake treatment fluids pumped down the well in attempts to reverse the wettability and break the emulsion in the filter-cake. Such "breaker" fluids typically contain surfactants, co-solvents, micro-emulsions and acids aimed at opening up the permeability of the filter-cake. U.S. Pat. No. 6,790,811 discloses one method of providing breakable filter-cakes where the emulsifiers are able to be protonated under acidic conditions. This is designed to make the filter-cake susceptible to acidic treatment fluids pumped into the well: acids have the effect of reversing the emulsion and water-wetting the solids in the filter-cake, rendering it permeable.

Unfortunately such treatments are frequently inefficient. The very low permeability of oil-based mud filter-cakes impedes the penetration of the breaker fluid. Often long "soak times" are required. Another problem is that if a portion of the filter-cake is quickly broken, the breaker fluid may then flow into the rock formation leaving the rest of the filter-cake untreated.

There is thus a need for oil-based muds which produce filter-cakes which are initially of low permeability, but which can be made to increase in permeability at a later stage, for example when the well is put onto production, or when water injection commences.

U.S. Pat. No. 5,057,234 discloses a wellbore fluid aimed at avoiding pollution or oil sheen upon discharge of wastes to the sea. It is a replacement fluid for an oil-based mud wherein the oil is replaced by a glycol that is soluble or dispersible in seawater having a salinity of about 3% and lower. The fluid is characterized by the absence of hydrocarbon, mineral, vegetable and animal oils. This wellbore fluid therefore contains two liquid phases: the glycol continuous phase and the emulsified brine.

WO1992/014798 discloses a drilling fluid aimed at avoiding pollution or oil sheen upon discharge of wastes to the sea. Here the oil in an invert emulsion drilling fluid is replaced by an organic fluid that is at least 40% soluble in water. It also is a wellbore fluid containing two liquid phases, the organic liquid and brine.

U.S. Pat. No. 5,990,050 discloses a drilling fluid aimed at avoiding pollution upon discharge of wastes (mud-covered cuttings) to the sea. The continuous liquid phase of the drilling fluid comprises or includes a preferentially-oil-soluble glycol ether which is miscible in oil and which is selected from propylene glycol n-butyl, ether (PnB); dipropylene glycol n-butyl ether (DPnB); tripropylene glycol n-butyl ether (TPnB); tetrapropylene glycol n-butyl ether; pentapropylene glycol n-butyl ether; hexapropylene glycol n-butyl ether; heptapropylene glycol n-butyl ether; and combinations thereof. The wellbore fluid of U.S. Pat. No. 5,990,050 therefore contains one homogeneous organic phase, and optionally an emulsified brine phase, i.e. one or two liquid phases.

GB 2 341 876 discloses a pumpable multiple phase emulsion, which consists of a treatment agent present in a first phase, the first phase being suspended in a second phase to form a first pumpable emulsion, and the first pumpable emulsion being dispersed in the third phase to form the pumpable three-phase composition. The resulting emulsion takes the form of either an oil phase-in-aqueous phase-in oil phase composition, or an aqueous phase-in-oil phase-in-aqueous phase composition.

WO 99/14285 discloses an electrically conductive wellbore fluid which comprises as its continuous phase a polar organic liquid. An oil may be present in admixture with the polar organic liquid.

WO 03/106587 also relates to electrically conductive wellbore fluids, and discloses a method of electrically logging subterranean wells using a conductive double emulsion fluid including an oil, an emulsifier capable of forming a microemulsion, an emulsifier capable of forming an invert emulsion, an electrolytic salt, and optionally a polar organic solvent.

SUMMARY OF THE INVENTION

There remains a need for filter-cakes which are initially of low permeability, but which can be made to increase in permeability at a later stage, for example when the well is put into production, or when water injection commences.

The present invention provides an oil-based wellbore fluid in the form of an emulsion which comprises a continuous phase comprising an oil and, dispersed therein, a first dispersed liquid phase and a second separate dispersed liquid phase, the first dispersed liquid phase being a brine phase, and the second dispersed liquid phase comprising a polar organic liquid, said polar organic liquid being insoluble or sparingly soluble in the brine comprising said first dispersed liquid phase, but being soluble in pure water.

The wellbore fluid is distinguished from the fluid of GB 2 341 876 in that the oil phase carries two separate phases liquid both dispersed therein, and has completely different properties from that fluid. The fluids of GB 2 341 876 are designed, on being pumped downhole, to have the emulsion break under the action of a stimulus such as the extremely high shear rates encountered on passing through the bit nozzles, thus liberating the material contained in the dispersed phase for treatment of the desired location in the wellbore. In contrast, the wellbore fluid of the present invention is designed to be stable to repeated circulation in and out of the well during the operation, for example drilling and completion operations.

Further, the wellbore fluid is distinguished from the fluids of WO 03/106587 because the fluids of WO 03/106587 comprise a water-in-oil emulsion which differs from conventional emulsions in that the continuous phase itself comprises a water-in-oil microemulsion. When a polar organic liquid is present, this forms part of the continuous phase, being at least partially soluble in the oil and also being at least partially soluble in water. In effect, it acts as a co-solvent for the electrolytic salt or brine, the salt being specifically chosen to be at least partially soluble in the mixture of oil and polar organic solvent. In contrast, in the wellbore fluid of the present invention, at least some of the polar organic liquid is present in the oil as a distinct dispersed liquid phase.

The invention also provides a method of carrying out a wellbore operation, which includes the steps of:
(a) introducing into a wellbore an oil-based wellbore fluid comprising a continuous phase comprising an oil and, dispersed therein, a first dispersed liquid phase and a second separate dispersed liquid phase, the first dispersed liquid phase being a brine phase, and the second dispersed liquid phase comprising a polar organic liquid, said polar organic liquid being insoluble or sparingly soluble in the brine comprising said first dispersed liquid phase, but being soluble in pure water;
(b) allowing a filter-cake to form; and subsequently
(c) allowing a further fluid to come into contact with the filter-cake, said further fluid having a level of salinity which is lower than the level of salinity of said first dispersed liquid phase, and being such that said polar organic liquid is soluble therein.

Surprisingly it has been found that the addition of even relatively small concentrations of a polar organic liquid in the form of a separate liquid phase greatly increases the ability of low salinity aqueous solutions to penetrate into and permeate through a filter-cake formed (typically upon the walls of the wellbore or in fractures, perforation tunnels or other conduits in a rock formation) during the use of the wellbore fluid of this invention. Thus, selection of a polar organic liquid which is insoluble or sparingly soluble in the dispersed brine phase and in the continuous oil phase enables a three-phase emulsion to be formed; while the fact that the polar organic liquid is soluble in pure water enables pure water to penetrate the filter-cake resulting from the use of the wellbore fluid. Of course, it is not always essential to use pure water as the further fluid designed to penetrate the filter cake. Rather, any fluid of a lower salinity than the brine comprising the first dispersed phase may be used, provided that the salinity is sufficiently low that the polar organic liquid is soluble in that lower salinity fluid. In a preferred embodiment of the invention, the brine comprising the first dispersed phase of the wellbore fluid is of a higher salinity than seawater, while the further fluid used in the method of the invention is seawater, the polar organic liquid being soluble in seawater.

The solubility of the polar organic liquid in the oil used as the continuous phase must of course be small under the actual conditions prevailing in the wellbore fluid. Many polar organic liquids which might normally be regarded as being soluble in the oil can, however, be used successfully in the present invention. This is because the presence of even small amounts of water dissolved in many polar organic liquids will inhibit the partition of the liquid into oils. This enables certain polar organic liquids that would dissolve in the oil under anhydrous conditions to be used in the present invention.

The polar organic liquid must be soluble in pure water. It is preferably also soluble in seawater, so that seawater rather than fresh water can be used as the second fluid. In addition, preferably the solubility of the polar organic liquid should be:

Greater than about 20% by weight in seawater at 20° C. As a model for seawater, the synthetic seawater approximating to that from the North Sea of about 3.5% by weight total dissolved salts prepared using the Seawater Corrosion Test Mixture kit (Product No. 331533P) available from VWR International Ltd., Poole, Dorset, UK, may be used.

Less than about 10% by weight in a 10% w/w aqueous NaCl solution at 50° C., or less than about 10% by weight in a 20% w/w aqueous $CaCl_2$ solution at 50° C. Which of these solubilities is the more relevant will depend upon the nature of the brine proposed for use in any particular wellbore fluid.

Less than about 5% by weight in n-tetradecane at 40° C. in the presence of at least 2% by weight of water. n-tetradecane is chosen because it is a pure compound that can reasonably represent the varying compositions of mineral oils used in oil-based muds.

Preferably, the oil:brine ratio by volume in a wellbore fluid of the invention is in the range of from 99.5:0.5 to 40:60, preferably 95:5 to 50:50. Preferably the concentration of the polar organic liquid in the wellbore fluid is in the range of from 1.5% to 40%, preferably 2% to 25%, more preferably 3% to 15% (percent by volume of the total volume of all three liquids at 20° C.). These figures refer to the actual quantities of oil, brine and polar organic liquid in the wellbore fluid, i.e. the actual quantities added to form the fluid.

The apparent quantities in each of the three phases may vary somewhat from the actual amounts added. This is because, in practice, the three liquid phases in the wellbore fluid of the invention will have a certain mutual solubility and will reach equilibrium; thus, a certain amount of the brine phase will dissolve in the polar organic liquid phase, a certain amount of polar organic liquid will dissolve in the brine phase, and a small amount of the polar organic liquid may dissolve in the oil. The terms oil phase, brine phase, and polar organic liquid phase used herein should be understood to embrace these oil-rich, brine-rich, and polar organic liquid-rich solutions. Of course, the polar organic liquid must be of low enough solubility in both the oil and the brine comprising the first dispersed phase, for the three-phase emulsion to form, and "sparingly soluble" should be construed accordingly. In general, as used herein, the term "sparingly soluble" applies to materials that are less than 10% by weight soluble at 50° C.

The precise physical structure of the wellbore fluids of the present invention will vary depending upon the exact nature of the components present, but in general the second dispersed liquid phase will comprise relatively large droplets of polar organic liquid having an average diameter of not less than 5 microns, typically not less than 10 microns. Such an emulsion will have limited stability, in contrast to a microemulsion. Microemulsions generally consist of a dispersed phase containing extremely small droplets, typically less than 0.1 microns in diameter; they appear clear to the naked eye (rather than cloudy or milky) and they are very stable.

In contrast to the second dispersed phase of the wellbore fluids of the present invention, the first dispersed liquid phase comprising a brine will tend to exist in the form of smaller droplets, typically having an average diameter of less than about 2 micron, for example less than about 1 microns.

Conventional oil-based muds, or reversible oil-based muds (i.e. muds in which the water-in-oil emulsion can be flipped to oil-in-water, and the oil wetting reversed or partly reversed to water-wetting, on being contacted by an acid treatment fluid) such as "FAZEPRO"™ from M-I Swaco LLC (the reversible OBM described in U.S. Pat. No. 6,790,811) contain emulsifiers that form very stable water-in-oil emulsions of calcium chloride brine or sodium chloride brine dispersed in the oil phase. The concentration of dissolved salt in the brine phase is normally in the range 15-30% by weight, and sometimes higher. As mentioned above, oil-based muds usually contain dispersed solid particles such as barite and calcium carbonate, oil-wetting agents to maintain such particles in an oil-wet condition, and the dissolved or colloidally-dispersed polymers or resins that are used to reduce filtration rates.

Without wishing to be bound by theory, it is believed that the action of the polar organic liquid as defined herein in promoting the ingress of low salinity water into the filter-cake is as follows. When the polar organic liquid is added to an oil-based mud, for example a mud as described above, it does not dissolve to a great extent in either the oil or the brine phase, thereby forming a third liquid phase. The resulting polar organic liquid phase is not well emulsified by the emulsifiers present in the fluid, but is physically dispersed in the oil phase as relatively coarse-sized droplets. When the wellbore fluid filters onto the exposed face of a permeable rock formation, the polar organic liquid droplets become trapped in the filter-cake. Because they are not well emulsified the droplets deform and coalesce under the differential pressure across the filter-cake to provide continuous or semi-continuous tortuous pathways through the porous network of the filter-cake. The polar organic liquid thus provides areas or routes in the filter-cake that are susceptible to facile dissolution by relatively low salinity water applied to the filter-cake under pressure.

The further fluid, comprising relatively low salinity water, can be, for instance, produced water from a gas well or an oil well, water (e.g. seawater) that is pumped into an injection well for reservoir pressure maintenance, or an aqueous wash fluid pumped into the well. In the case of injected or produced low salinity water the water acts as a treatment fluid for the filter-cake with the advantage that both the treatment volume and "soak time" are vastly increased compared to the normal short-term/low-volume filter-cake treatment fluids that are pumped into place and allowed to soak for only short periods (for example a few hours or one day).

This invention is especially suited for use in drilling and completing water injection wells, for example seawater injection wells. For production wells where the water co-produced with the hydrocarbons happens to have a high salinity, the wellbore fluids of this invention can advantageously be used in conjunction with lower salinity treatment fluids pumped into the well to treat the filter-cake. Such a treatment fluid acts as a more effective breaker than it would for the more tenacious filter-cakes from conventional oil-based mud formulations.

The invention is also especially suited for gas wells that produce low-salinity water as a result of condensation of water caused by adiabatic cooling. The gas flowing through the formation towards the wellbore expands as the pressure reduces from that far into the formation down to the lower pressure in the wellbore. This causes cooling and the condensation of low salinity water from the water-vapour-saturated gas. The low-salinity water impinging onto the filter-cake causes the seal to be broken.

Thus, overall, the method of the invention can improve completion efficiency (either productivity or injectivity), and promises much reduced formation or Skin Factor, especially where a well either produces or has injected quantities of low salinity water over prolonged periods. Skin factor is a dimensionless number that is a measure of formation damage related to the increased pressure drop across the zone around the wellbore which has been damaged (reduced in permeability) by invasion of the wellbore fluid.

Any suitable polar organic liquid having the required properties may be used in a wellbore fluid according to the invention. If desired, two or more of the defined polar organic liquids may be present. The polar organic liquid should be a liquid at atmospheric pressure at temperatures between 10° C. and 100° C. Furthermore the polar organic liquid is chosen from those compounds whose solubility in aqueous solutions of salts, especially sodium chloride or calcium chloride, decreases markedly as the concentration of the salt increases.

Preferably, a polar organic liquid is selected which does not exhibit a strong surface-active effect which could adversely affect the stability of the wellbore fluid of the present invention. The wellbore fluid is an invert (i.e. water-in-oil) emulsion, and loss of stability could cause problems such as greatly increased filtration rate (for example as measured by the high-temperature high-pressure fluid loss test described below) at elevated temperature and pressure, brine droplet coalescence giving free water in the filtrate, and water-wetting and agglomeration of suspended particles such as barite. Also the polar organic liquid should preferably not cause swelling of clay-rich rock formations.

The polar organic liquid may for example be a polyalkylene glycol, an ester, a diol, or an ether. In general, suitable polar organic liquids will comprise carbon, hydrogen and oxygen atoms only. Compounds containing at least one, preferably several, ether links, are particularly suitable. Preferably the polar organic liquid is a polyalkylene glycol ("PAG"), preferably having no significantly large hydrophobic or hydrophilic molecular chains. Generally, the molecular structure of such materials will not contain alkyl groups having more than 5 carbon atoms. Especially preferred is a block copolymer or, preferably, an alternate or random copolymer of ethylene oxide and propylene oxide, or a polypropylene glycol having a number average molecular weight of about 200 to about 600. Preferred examples include random copolymers of ethylene oxide (EO) and propylene oxide (PO), especially when initiated by water, ethylene glycol or propylene glycol. Alkoxylates initiated using an alkanol having five or less carbon atoms may also be used, but in some circumstances may be less preferred because they have well-defined hydrophobic and hydrophilic segments in their molecules, exhibit increased surface-active effects, and can have an adverse effect on the stability of the oil-based invert emulsion wellbore fluid.

Low molecular weight polypropylene glycols such as tetrapropylene glycol and polypropylene glycol with a number average molecular weight of about 200 to about 600 are also very suitable. For example polypropylene glycol with a number average molecular weight of about 400 is suitable for use with wellbore fluids having either a calcium chloride or a sodium chloride brine phase. Tetrapropylene glycol (molecular weight 254) is particularly suitable for use with a wellbore fluid having a sodium chloride brine phase; it is less preferred for use in conjunction with, for example, a 20% w/w calcium chloride brine phase in the wellbore fluid, as it is quite soluble in this type of brine.

The solubility of PAGs in various brines can be manipulated by varying the molecular weight of the product and the molar ratio of, e.g. EO to PO in order to achieve the required properties. Also, the initiator and possible end-caps may be varied to produce suitable polar organic liquids.

Especially preferred are random copolymers of EO and PO some of which are exemplified by the following BREOX™ products manufactured by Cognis: BREOX 50A 20, BREOX 50A 20S, BREOX 60W 460, BREOX 60W 1000, and BREOX 75W 2050. Other suitable commercial polyalkylene glycols include DCP 208 available from Innovene, GEM CP and GEM GP available from Baroid Fluid Services (division of Halliburton), GLYDRIL LC and GLYDRIL MC from M-I Swaco LLC, AQUACOL and AQUACOL B from Baker Hughes Drilling Fluids. Various polyalkylene glycols and alcohol alkoxylates have been used before in water-based drilling fluids as shale hydration inhibitors and lubricants. They have not been used in oil-based drilling fluids to provide a third liquid phase which imparts the characteristic of improving the permeability of the filter-cake on contact with low salinity water.

The oil-soluble glycol ethers, for example n-butyl ethers of propylene glycol and oligopropylene glycols, used in U.S. Pat. No. 5,990,050 are unsuitable as they exhibit insufficient water solubility and too much oil-solubility.

Polytetrahydrofuran having a low average molecular weight in the range of about 160 to about 450, such as Poly-THF Polether Diol 250 from BASF, is also suitable for use in the present invention.

Certain ethers, for example dialkyl ethers of oligo-ethylene glycols, especially the dialkyl ethers of triethylene glycol and higher oligo-ethylene glycols, have high solubility in seawater, much-reduced solubility in higher concentration brines, and reduced solubility in hydrocarbons in the presence of water. Similarly polyalkylene glycols can be end-capped with ester groups to manipulate the solubility characteristics, hence diesters of an oligo-ethylene glycols may be mentioned.

Water Activity (Aw) is a parameter related to osmotic pressure and vapour pressure, and is used to assess the physical properties of solutions. The emulsified brine phase of the oil-based wellbore fluid will normally comprise a salt solution that exhibits a reduced Water Activity compared to 100% water. The reduced Water Activity is designed to inhibit the osmotic diffusion of water from the drilling fluid into (for instance) a shale formation. If this were to occur it would cause wellbore instability such as caving due to the increased pore pressure within the shale. In general, a 25% by weight solution of a salt will exhibit a Water Activity of about 0.75.

For most applications, the brine phase of the wellbore fluid will preferably be of significantly higher salinity than seawater. Preferably, it contains at least 5% by weight, preferably at least 10% by weight, and more preferably at least 15% by weight of a dissolved salt or mixture of salts. The brine may typically contain up to 25% by weight of salt, with upper limits being those defined by the solubility of the salt or salts in question. Salt content in wellbore fluids is generally based on the quantities of water and salt added during preparation of the wellbore fluid. The salt content will affect the density of the wellbore fluid, which is important for well-control purposes: high concentration and hence denser brines can advantageously reduce the quantity of solid, water-insoluble weight material such as barite required to obtain the required density for the wellbore fluid.

The aqueous phase in the wellbore fluid of the invention may be a synthetic brine containing one or more salts. Suitable salts include alkali metal halides; the alkaline earth metal halides; and sodium, potassium or caesium acetates or formates. Carbonate, sulfate, phosphate, silicate and citrate salts (among other polyvalent anions) may also be used if desired. Preferred salts include for example sodium chloride or calcium chloride. Mixtures of salts may be used. In the case of wellbore fluids having a relatively low salinity (e.g. 5% by weight) brine phase, the presence of a salt other than sodium chloride or calcium chloride may be helpful to avoid unduly high levels of the polar organic liquid dissolving into the brine. Polyvalent anion salts such as citrates, phosphates, silicates, sulfates and carbonates, particularly their alkali metal salts, are very effective at suppressing the dissolution of, for example, polyalkylene glycols, compared with halides.

The salinity of the further fluid, i.e. a relatively low salinity water applied naturally or deliberately to the filter-cake, will always be lower than the salinity of the brine phase in the wellbore fluid. It must be sufficiently low in salt content to be capable of forming a single phase with the polar organic liquid. Pure water may be used, but a brine having a total dissolved salts content of less than about 5% by weight total dissolved salts, for example seawater, will usually be preferred because fresh water can cause damaging fines mobilisation within reservoir racks such as sandstone, and because of the ready availability of, for example, seawater. The average total salts content by weight for seawater is about 3.5%, varying from 0.8% (Baltic Sea) to about 1.25% (Caspian) to 3.8% and 4.0% (Mediterranean and Red Sea respectively).

To obtain an efficient process, the concentration of salt(s) in the brine phase of the wellbore fluid may be at least twice, preferably at least four times, the concentration of salts in the further, relatively low salinity, fluid. Thus, in the case of a water injection well where the relatively low salinity fluid is injected seawater (typically containing about 3.5% by weight dissolved salts) which assumes the role of a clean-up fluid, the water phase of the wellbore fluid should contain at least 7%, preferably at least 14%, by weight total dissolved salts.

Typically, the wellbore fluid of the invention may be one of those used in drilling, completion, lost-circulation control, workover (repair), hydraulic fracturing, or any other well treatment operations where it is desirable to reduce the loss of filtrate to the formation.

The oil phase in a wellbore fluid of the invention can be any of the known base oils used or mooted for use in oil-based muds. These include crude oil; hydrocarbon refined fractions from crude oil such as diesel fuel or mineral oil; synthetic hydrocarbons such as n-paraffins, alpha-olefins, internal olefins, and poly-alphaolefins; synthetic liquids such as nonpolar dialkyl ethers, alkyl alkanoate esters, and acetals; natural oils such as triglycerides including rape-seed oil and sunflower oil; or any mixture of these. Low toxicity and highly biodegradable oils are generally preferred.

The wellbore fluids of this invention may further contain any known wellbore fluid additives such as emulsifiers; wetting agents; deflocculants; clays; organoclay or polymeric viscosifiers; filtration reducers such as lignite derivatives, asphalts, asphaltites such as gilsonite or polymers dissolved or colloidally dispersed in the oil; weighting agents such as finely divided barium sulfate (barite), calcium carbonate (calcite), the mixed carbonate of calcium and magnesium (dolomite), hematite, haussmanite, and mixtures thereof; lubricating additives; temporary bridging particles such as calcium carbonate, sparingly water-soluble/oil-insoluble solids such as melamine or lithium carbonate, suspended salt particles, or any other functional additive known to those skilled in the art.

Preferably, a bridging particulate material is added to a wellbore fluid of the present invention in order to assist in the formation of a filter-cake and to assist in bridging the fractures. Bridging agents are composed of solid particles whose particle size is such that they will not appreciably intrude into a porous and permeable rock formation such as sandstone. On the wellbore wall there are exposed entrances to pores or fissures in which the bridging particles "log-jam" and start to build a filter-cake. The permeability of the rock matrix or fissures is thus protected from plugging by invaded materials.

Suitably, the bridging particulate material is sized so as not to enter the pores or fissures of any permeable rock through which the wellbore passes. Typically, the bridging material has an average particle diameter in the range 15 to 2000 microns. The size chosen depends upon the particular operation in which the wellbore fluid is being employed and the size of the pores, fissures or other conduits in the rock formation. The bridging material may comprise substantially spherical particles, or angular particles such as those produced by grinding. However, it is also envisaged that the bridging material may comprise elongate particles, for example, fibres or flakes. Preferably, the bridging material has a broad (polydisperse) particle size distribution.

Typical bridging particulate material comprises at least one substantially crush resistant particulate solid, for example graphite, calcium carbonate, celluloses, micas, proppant materials such as sands or ceramic particles and combinations thereof. These materials are very inert and are environmentally acceptable. However, because this invention concerns filter-cakes that are removed or made permeable by the application of relatively low salinity water, it is preferred that the bridging particles have at least some water-solubility. The use in drilling and completion fluids of salt particles such as sodium chloride suspended in oil-based fluids is known. The use of Conventional oil-wetting agents in these oil-based suspended salt fluids can result in delayed clean-up of the filter-cakes. The use of the present invention together with the known suspended salt bridging solids can provide an improvement in the rate and degree of filter-cake removal by low salinity water, and therefore provides a preferred embodiment of the invention.

Further, this invention is also well-suited to be applied in conjunction with sparingly water-soluble bridging solids such as are described in WO 2007/088322. The sparingly soluble bridging solids are particles of melamine, lithium carbonate, magnesium sulfite or lithium phosphate. They have the advantage over suspended sodium chloride fluids that they are less prone to suffer premature failure of the filter-cake and losses of the wellbore fluid to the formation.

Similarly, for acid-soluble bridging particles such as calcium carbonate, the increase in permeability of a filter-cake in the relatively low salinity fluid (e.g. seawater) increases the effectiveness of a subsequent clean-up with an acid solution. The sparingly soluble bridging agents of WO 2007/088322 are also readily soluble in mild acid solutions.

The quantity of auxiliary substances and additives used in each case lie within the usual boundaries for a wellbore fluid.

Preferably the plastic viscosity of the wellbore fluid of the present invention is in the range 1 to 100 mPa·s. Preferably, the yield point is between 2 and 50 Pa.

BRIEF DESCRIPTION OF THE DRAWINGS

The invention will now be described with reference to the following Examples and the accompanying drawings in which FIGS. 1 to 3 illustrate the results of Example 4 graphically. The following US to metric unit conversion factors were used in the examples:

Figure 1:
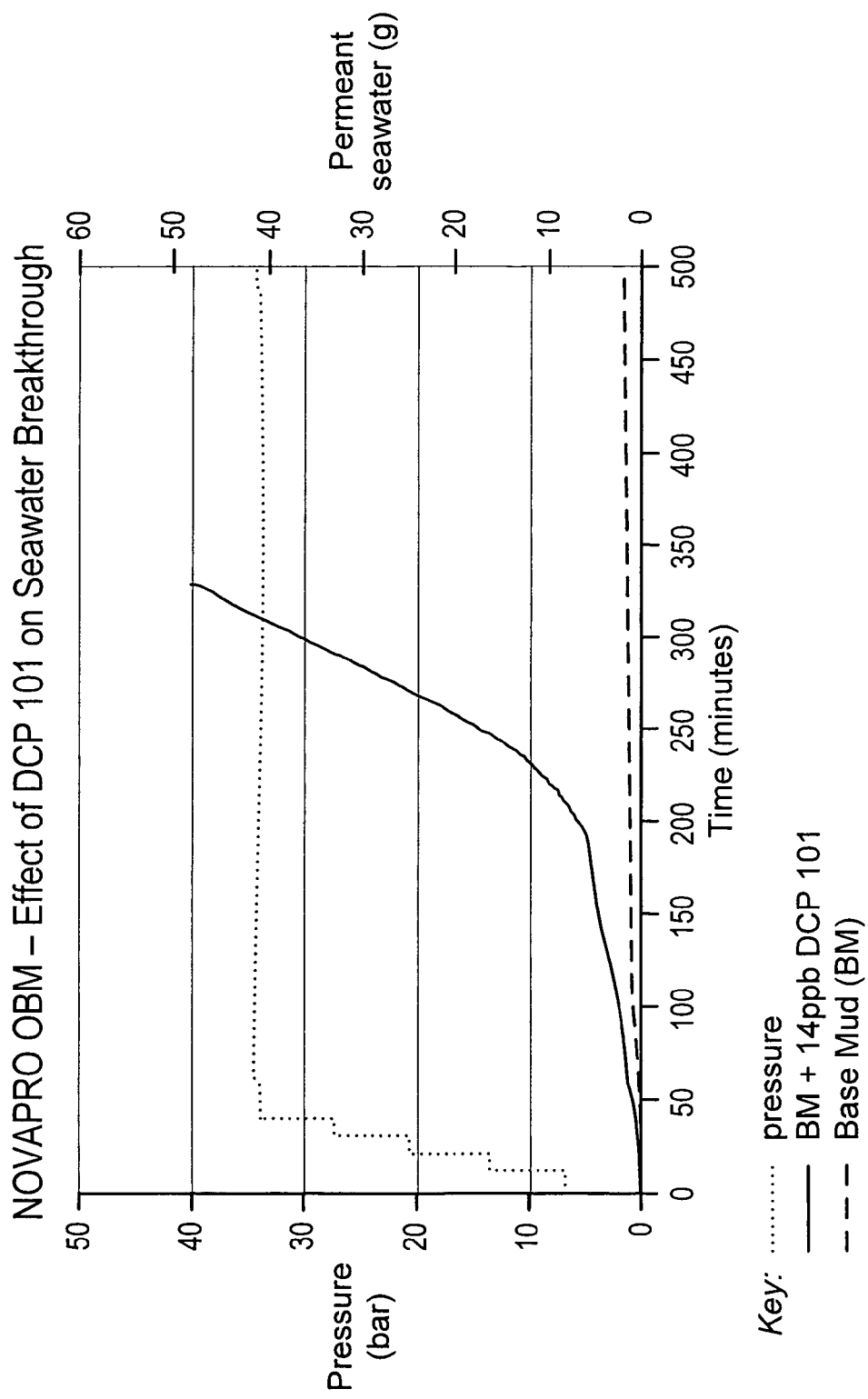

1 US gallon (gal)=3.785 litres
1 lb=0.454 kg
1 lb/gal (ppg)=0.1198 g/cm$^3$
1 barrel (bbl)=42 gal
1 lb/bbl (ppb)=2.835 kg/m3
1 lb/100 ft$^2$=0.4788 Pascal (Pa)
1 lb/sq.in. (psi)=6.895×10$^3$ Pa The various oil-based wellbore fluid formulations were tested for their viscous, properties, their filtration at high temperature and high pressure (HTHP Fluid Loss), and their electrical stability ($E_s$ emulsion breakdown voltage) in accordance with the specifications of the American Petroleum Institute (API) guidelines "Recommended Practice for Field Testing of Oil-Based Drilling Fluids", API RP13B-2, Fourth Edition 2005.

The HTHP Fluid Loss test employs a pressurized cell fitted with a standard hardened filter paper as a filtration medium. The filtration area is 7.1 square inches (0.0045 m$^2$) or may be smaller. If smaller, the result reported is corrected to a filter area of 7.1, square inches. For instance the filtrate volume using a 3.55 square inches (0.0023 m$^2$) filter area is doubled to provide the corrected result. Generally, the filtration behaviour of the wellbore fluid in the HTHP test is determined with a pressure differential across the filter paper of 500 psi (3.45× 10$^6$ Pa). Suitably, the temperature at which the HTHP fluid loss test is carried out may be varied to correspond to the downhole temperature. Generally, the test temperature is in the range 50 to 150° C. A filter-cake is allowed to build up on the filter paper for 30 minutes and the volume of filtrate collected during this 30 minute period is then recorded.

The seawater used in all the examples was synthetic seawater approximating to that from the North Sea of about 3.5% by weight total dissolved salts. It was prepared using the Seawater Corrosion Test Mixture kit (Product No. 331533P)

conforming to DEF 1053/B.S.3900/B.S.2011, available from VWR International Ltd., Poole, Dorset, UK.

EXAMPLE 1

TABLE 1

PROPERTIES OF SOME POLYALKYLENE GLYCOLS SUITABLE AS THE POLAR ORGANIC LIQUID ADDITIVE

| Product | Initiated with | EO:PO molar ratio | Viscosity at 40° C. cSt | Cloud point of ° C. (at 1% in water or as stated) | Solubility in seawater of 3.5% wt TDS at 20° C. (% wt.) |
|---|---|---|---|---|---|
| BREOX 50A 20 | n-butanol | 50:50 | 19 | no data | >20 (miscible) |
| BREOX 50A 20S | n-butanol | 50:50 | 18-22 | 55.6 (5%) | >20 (miscible) |
| DCP 101 | n-butanol | 50:50 | 19 | 63 (at 3%) or 53 (at 6%) | >20 (miscible) |
| DCP 208 | n-butanol | 100:0 | 7.3 | >100 (6%) | >20 (miscible) |
| BREOX 60W 460 | diol | 60:40 | 455 | >80 | >20 (miscible) |
| BREOX 60W 1000 | diol | 60:40 | 1000 | 72 | >20 (miscible) |
| BREOX 75W 2050 | diol | 75:25 | 2025 | 75 | >20 (miscible) |
| Tetrapropylene glycol | | 0:100 | 35 | >100 | >20 (miscible) |
| Polypropylene glycol M. Wt. 400 | | 0:100 | 26 | 75 (at 1%) or ~50 (at 10% in seawater) | >20 |

The Breox materials shown are all random copolymers of EO and PO. "BREOX", DCP 101 and DCP 208 are Trade Marks.

The solubility of all of the above materials at 50° C. in sodium chloride brine of strength 10% by weight or greater is less than 10% by weight. All except tetrapropylene glycol were less than 10% by weight soluble in 20% by weight calcium chloride brine at 50° C. All showed very low solubility (<2% by weight) in n-tetradecane in the presence of 2% w/w water at 40° C. They are dais very suitable for forming a third liquid phase in an oil-based wellbore fluid.

Into screw top jars, 20 ml of each of the polyalkylene glycols listed in Table 1 was mixed with 20 ml of sodium chloride brine (20% by weight NaCl) and 60 ml of a mineral oil, Clairsol 370, which is available from Petrochem Carless. The jars were sealed and thoroughly shaken, and then placed in an oven at 50° C., occasionally venting the slight pressure increase as they heated up.

After 4 hours the jars were examined. On close examination each was seen to contain three separate liquid layers having volumes approximating to those added. The oil-rich phase resided on top of a middle PAG-rich phase which was in turn above the bottom brine-rich phase. The close examination was required because the interfaces between the water-white phases, although sharp, were not very easy to see, presumably because of similar refractive indices.

This experiment shows that suitable polar organic liquids are capable of forming a distinct third liquid phase in the presence of oil and brine. It is quite unusual to have three liquid phases coexisting as many organic liquids are either too oil-soluble or too water-soluble.

EXAMPLE 2

Solubility of DCP 101 in Various Brines

The solubility of DCP 101 was tested in the following liquids at varying temperatures:
Synthetic North Sea Seawater
Sodium chloride brine
Calcium chloride brine
n-tetradecane The brine solutions shown in the table were prepared using deionised water and laboratory grade salts. The % values shown are % by weight of anhydrous salt in the brine. A retained sample of DCP 101 previously available commercially from BP Chemicals was used for the test. A material identical to DCP 101 is now available as BREOX 50A 20S from Cognis.

Weighed portions of about 50 g of each saline solution were heated in an oven in screw-top glass jars to the temperatures shown, or used at room temperature (22° C.). Small quantities of DCP 101 were weighed into each jar after which the temperature was restored in the oven for 60 minutes. This procedure was repeated until the first development of a hazy/cloudy solution was seen, representing the limit of solubility.

The results in Table 2 show that DCP 101 is very soluble in cool (22° C.) seawater but much less soluble in seawater at 40 or 50° C. This suggests that, for seawater injection, its use is best suited to wells having a relatively low Bottom Hole Temperature (BHT). Thus, when cold seawater is injected, the maintenance of a cool BHT allows high solubility and removal of the DCP 101 accumulated in the filter-cake.

In a separate test, no measurable (less than 2%) dissolution of DCP 101 occurred on mixing 10 g with 90 g of n-tetradecane and 2 g of water. Thus, DCP 101 can suitably provide the third liquid phase of the wellbore fluid.

TABLE 2

Solubility Data for DCP 101

| Fluid | Temp (° C.) | DCP101 solubility % by weight of brine + PAG solution |
|---|---|---|
| Seawater | 22 | Miscible up to at least 35% |
| Seawater | 40 | 2.9 |
| Seawater | 50 | 2.5 |
| 10% NaCl | 22 | 4.4 |
| 10% NaCl | 40 | 1.5 |
| 10% NaCl | 50 | 0.5 |
| 10% CaCl2 | 22 | 6.7 |
| 10% CaCl2 | 40 | 1.9 |
| 10% CaCl2 | 50 | 0.8 |
| 20% CaCl2 | 22 | 2.5 |
| 20% CaCl2 | 40 | 1.0 |
| 20% CaCl2 | 50 | 0.5 |

EXAMPLE 3

Effects of Adding Polar Organic Liquids on Oil-Based Drilling Fluid Properties

The purpose of this example is to demonstrate that effective amounts of suitable polar organic liquids can be added to commercial oil-based mud formulations without changing the fluid properties to unacceptable values.

Materials
Amodrill (C12/16/18) Product of Innovene. Blend of $C_{12}$-$C_{18}$ Linear alphaolefins. Base oil for drilling fluid.

Escaid 110 Product of Exxon. Low Toxicity Mineral Oil. Base oil for drilling fluid.

Baroid Alkane. Product of Baroid Fluid Services (division of Halliburton). n-alkane mixture predominantly $C_{12}$-$C_{16}$. Base oil for drilling fluid.

Bentone 38 Product of Elementis Specialties. Organophilic clay viscosifier.

GELTONE II. Product of Baroid Fluid Services (division of Halliburton). Organophilic clay viscosifier.

ECOTROL RD Product of M-I Swaco LLC. Fluid Loss Reducing copolymer.

Adapta HP Product of Baroid Fluid Services (division of Halliburton). Fluid Loss Reducing copolymer.

NOVAMUL Product of M-I Swaco LLC. Water in Oil Emulsifier.

FAZEMUL Product of M-I Swaco LLC Water in Oil Emulsifier.

FAZEWET Product of M-I Swaco LLC Oil-wetting agent.

EZ Mul 2F Product of Baroid Fluid Services (division of Halliburton). Water in Oil Emulsifier.

STARCARB Product of M-I Swaco LLC. Ground calcium carbonate bridging and weighting agent.

DCP 101 Polyalkylene glycol now available as BREOX 50A 20S from Cognis. EO/PO random copolymer, n-butanol initiator.

DCP 208 Product of Innovene. Ethylene oxide adduct of n-butanol.

GLYDRIL LC Product of M-I Swaco LLC Low Cloud Point polyalkylene glycol EO/PO copolymer.

BREOX 50A 20 and BREOX 50A 680. Products of Cognis. Random 1:1 copolymers of EO and PO initiated by n-butanol. The 680 grade is of higher molecular weight. The 20 and 680 suffixes approximate to the products' viscosity in centiStokes.

LIME hydrated lime (calcium hydroxide).

Test Procedure

The drilling fluid formulations shown are for about 350-400 mls of mixed fluid. They were mixed using a Silverson L4R mixer in accordance with the "Recommended Practice Standard Procedure for Field Testing Oil-Based Drilling Fluids", API Recommended Practice 13B-2, Fourth Edition, 2005; and with ISO 10416:2002 (API RP 13I $7^{th}$ edition 2004 "Recommended Practice for Laboratory Testing of Drilling Fluids". Sufficient quantity was mixed to allow the subsequent addition of the polar organic liquids as detailed below to 350 ml portions of the fluids.

Each fluid was then placed in pressure cells and heat aged for 16 hours at 93° C. in a Hot Rolling Oven prior to testing for their Viscous Properties at 50° C., their Electrical Stability at 50° C. ($E_s$ emulsion breakdown voltage), and their Filtration at high temperature and high pressure (HTHP Fluid Loss. The HTHP FL tests were performed at 93° C. and 500 psi (3.447 MPa) differential pressure using an HTHP cell having a removable cap at the opposite end to the filter element. The filter element used was an Aloxite™ disc with a pore size of 10 microns.

The removable cap allows the cell to be drained of mud after the test without disturbing the filter-cake formed. The cell can then be filled with seawater to allow the Seawater Breakthrough test on the filter-cake as detailed in Example 4.

Base Mud 1. NOVAPRO Formulation (M-I Swaco). Specific gravity=1.37 (11.5 lbs/US gallon (ppg))

| PRODUCT | grams | Mixing time (mins) |
|---|---|---|
| Amodrill (C12/16/18) | 140.9 | |
| Bentone 38 | 2 | 5 |
| Lime | 8 | 1 |
| ECOTROL RD | 1 | 5 |
| NOVAMUL | 12 | 1 |
| Deionised water* | 121 | 20 |
| Calcium chloride* | 75.1 | |
| STARCARB | 122 | 15 |

*CaCl2 + water is premixed as brine

The base mud was tested and also two fluids having the addition (to 350 ml aliquots) of a) 14 g of DCP101 and b) 14 g of DCP 208. This dose corresponds to about 4% by volume polyalkylene glycol (% of the total liquids volume).

The results are shown in Table 3.

TABLE 3

FLUID PROPERTIES AFTER HOT ROLLING

| Fluid PROPERTY | BASE MUD (BM) | BM + 14 ppb of DCP 101 | BM + 14 ppb of DCP 208 |
|---|---|---|---|
| Plastic viscosity cP | 21 | 19 | 11 |
| Yield point lb/100 ft$^2$ | 9 | 4 | 6 |
| Gel strength 10 sec/10 min lb/100 ft$^2$ | 5/6 | 3/4 | 3/4 |
| Electrical stability (v) at 121° F. (50° C.) | 600 | 380 | 50 |
| HTHP FL (ml) | 2.2 | 2.8 | 17.2 |

The results show that the addition of DCP 101 had a small and acceptable effect on fluid properties.

The addition of DCP 208 at the dose used caused a much larger and unacceptable adverse effect on electrical stability and filtration properties. This is ascribed to the water-wetting surfactant effect provided by DCP 208 due to the hydrophobic $C_4$ and the hydrophilic polyoxyethylene portions in its molecule.

DCP 208 and other polar organic liquids having considerable "surfactant" character are therefore less preferred.

Base Mud 2 FAZEPRO Formulation (M-I Swaco). Specific Gravity=1.224 (10.20 ppg) Oil:Water Ratio=48:52 by Volume

| Products | g | Mixing time (mins) |
|---|---|---|
| Escaid 110 | 117.53 | |
| FAZEMUL | 8.00 | 1 |
| FAZEWET | 4.00 | 1 |
| BENTONE 38 | 3.25 | 5 |
| LIME | 6.00 | 1 |
| STARCARB | 120.53 | 15 |
| Sodium chloride | 40.6 | |
| Water (brine premixed) | 128.6 | 20 |

The base mud was tested and also a fluid having the addition to a 350 ml aliquot of base mud of 14 g of GLYDRIL LC. This dose of polyalkylene glycol corresponds to about 4.4% by volume (% of the total liquids volume).

The results are shown in Table 4

TABLE 4

FAZEPRO FLUID PROPERTIES AFTER HOT ROLLING

| Fluid PROPERTY | BASE MUD (BM) | BM + 14 ppb of GLYDRIL LC |
|---|---|---|
| Plastic viscosity cP | 21 | 30 |
| Yield point lb/100 ft$^2$ | 30 | 16 |
| Gel strength 10 sec/10 min lb/100 ft$^2$ | 15/16 | 8/8 |
| Electrical stability (v) at 121° F. (50° C.) | 126 | 240 |
| HTHP FL (ml) | 3.1 | 6.0 |

The addition of GLYDRIL LC clearly has some effects on the viscous and filtration properties, but these are within acceptable limits. The electrical stability on this occasion actually improved.
Base Mud 3 Baroid Alkane Formulation. Specific Gravity 1.052 (8.8 ppg) Oil:Water Ratio ~40:60 by Volume.

| PRODUCT | g | mixing time (mins) |
|---|---|---|
| Baroid Alkane | 155.7 | |
| EZ Mul 2F | 12 | 1 |
| Lime | 4 | 5 |
| Caustic Soda | 1 | 5 |
| Adapta HP | 2 | 2 |
| GELTONE II | 6 | 5 |
| Water } premix | 99.2 | 20 |
| CaCl2•2H2O } premix | 51 | |
| Barite | 22.34 | 5 |
| HMP Clay | 15 | 15 |

The base mud was tested and also two fluids having the addition to 350 ml aliquots of base mud of a) 20 g of BREOX 50A 680 and b) 20 g of BREOX 50A 20. This dose corresponds to about 6% by volume polyalkylene glycol (% of the total liquids volume).

The results are shown in Table 5. It can be seen that the addition of the BREOX random EO/PO copolymers did not produce strongly adverse effects on fluid properties, even at the higher dose employed here. The larger increase in HTHP FL with BREOX 50A 20 is ascribed to its much lower viscosity (19 cSt) than that of BREOX 50A 680 which has a Kinematic Viscosity of about 680 cSt.

TABLE 5

BAROID ALKANE FLUID PROPERTIES AFTER HOT ROLLING

| Fluid PROPERTY | BASE MUD (BM) | BM + 20 g of BREOX 50A 680 | BM + 20 g of BREOX 50A 20 |
|---|---|---|---|
| Plastic viscosity cP | 15 | 23 | 18 |
| Yield point lb/100 ft$^2$ | 18 | 17 | 17 |
| Gel strength 10 sec/10 min lb/100 ft$^2$ | 9/9 | 5/5 | 4/4 |
| Electrical stability (v) at 121° F. (50° C.) | 269 | 257 | 395 |
| HTHP FL (ml) | 3.4 | 3.8 | 5.0 |

EXAMPLE 4

Susceptibility of Filter-Cakes to the Permeation of Seawater—Effects of Polar Organic Liquids After the HTHP Fluid Loss test had created filter-cakes from the fluids tested in Example 3, the cell was cooled and the pressure-inlet end-cap removed. Excess drilling fluid was drained from the cell leaving the filter-cake intact and undisturbed at the other end. The cell was then filled with seawater, closed and replaced in the heating jacket set at 60° C.

Upon reaching equilibrium temperature, a top pressure of 100 psi (0.689 MPa) was applied to the seawater for a period of 10 minutes, followed by 10 minutes at 200 psi (1.379 MPa), 10 minutes at 300 psi (2.068 MPa), then 10 minutes at 400 psi (2.758 MPa), and finally 500 psi (3.447 MPa). The 500 psi (3.447 MPa) squeeze was applied for as long as it took for the quantity of seawater (~50 ml) to permeate through the filter-cake or until it was obvious that no significant breakthrough of permanent seawater would occur.

The permeated seawater was collected in a tared container on a top-loading balance attached to automatic data recording. The results are shown graphically in FIGS. 1 to 3 of the attached drawings.

4.1 NOVAPRO Formulation (M-I Swaco)—Effect of DCP 101

FIG. 1 shows the effect of DCP 101 on seawater breakthrough on the NOVAPRO oil based mud formulation. It shows that DCP 101, even when added to the drilling fluid at a low dose of 4% by volume of the liquid phases, has a significant effect. Although little permeation occurred initially, after about three hours at 500 psi (3.447 MPa) the permeation rate increased markedly for the DCP 101—treated filter-cake. This is in marked contrast to the untreated base mud which shows essentially no permeation in FIG. 1, and then no permeation over the 2 V2 days (weekend) that the test was allowed to run.

4.2 FAZEPRO Formulation (M-I Swaco)—Effect of Glydril LC

Figure 2:
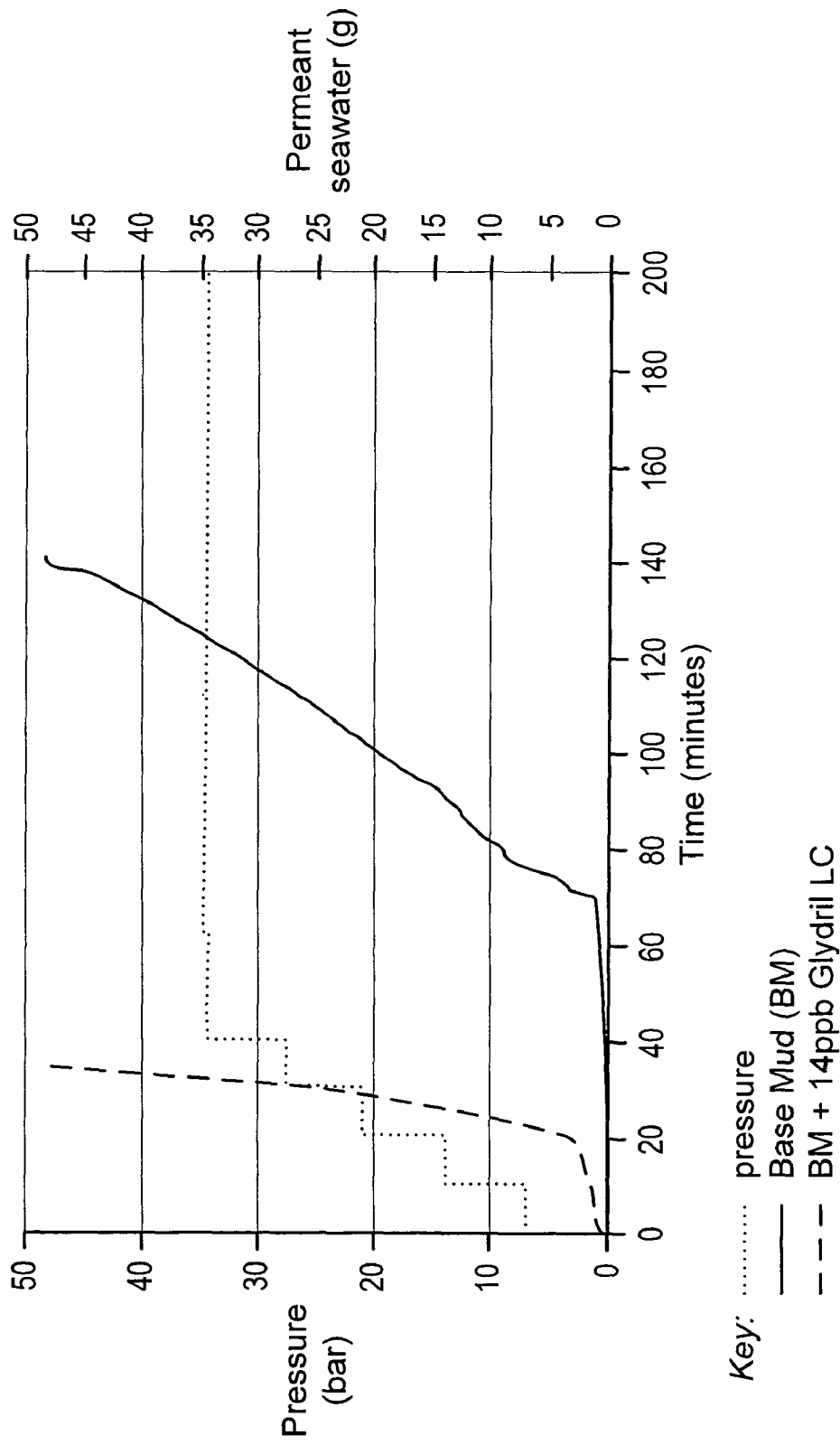

FIG. 2 shows the effect of Glydril LC on seawater breakthrough for a FAZEPRO reversible oil based mud. It shows firstly that the FAZEPRO formulation does allow a certain level of seawater permeation through its filter-cake even in the absence of any acidic treatment (FAZEPRO filter-cakes are designed to be broken by acid treatments). After about 30 minutes at 500 psi (3.447 MPa) a sudden increase (breakthrough) in seawater rate occurred.

For the filter-cake treated with GLYDRIL LC a rapid increase in rate occurred when the pressure was raised to 300 psi (2.068 MPa) illustrating that POL treatments can provide very useful reductions in breakthrough pressure. The seawater permeation rate was increased more than 8-fold compared to the untreated mud-cake.

4.3 Baroid Alkane Formulation—Effect of BREOX PAGs

FIG. 3 shows the effect of BREOX® PAGs on seawater breakthrough for a Baroid alkane oil based mud. This once more shows the persistently intact seal against seawater injection provided by the filter-cake from conventional OBMs (conventional in comparison to FAZEPRO which is designed to exhibit enhanced breakability).

In contrast the permeation rate through the filter-cake from the mud treated with BREOX 50A 20 increased rapidly when the pressure reached 500 psi (3.447 MPa)).

Even more effective was the BREOX 50A 680 treatment. The breakthrough pressure was reduced to 200 psi (1.379 MPa) and the permeation rate was dramatically increased.

The invention claimed is:

1. An oil-based wellbore fluid in the form of an emulsion which comprises continuous phase comprising an oil and, dispersed therein, a first dispersed liquid phase and a second separate dispersed liquid phase, the first dispersed liquid phase being a brine phase containing at least 5% by weight of a dissolved salt or a mixture of salts, and the second dispersed liquid phase comprising a polar organic liquid, said polar organic liquid being insoluble or sparingly soluble in the brine comprising said first dispersed liquid phase, but being soluble in pure water, wherein said second dispersed liquid phase is in the form of droplets having an average diameter of not less than 5 microns.

2. A wellbore fluid as claimed in claim 1, in which the polar organic liquid has a solubility of greater than 20% by weight in a synthetic seawater at 20° C. wherein the synthetic seawater contains 3.5% by weight dissolved salts; a solubility of less than 10% by weight in a 10% w/w aqueous NaCl solution at 50° C. or less than 10% by weight in a 20% w/w $CaCl_2$ aqueous solution at 50° C.; and a solubility of less than 5% by weight in n-tetradecane at 40° C. in the presence of at least 2% by weight of water.

3. A wellbore fluid as claimed in claim 1, in which the oil:brine ratio by volume is in the range of from 99.5:0.5 to 40:60; and the concentration of the polar organic liquid is in the range of from 1.5% to 40% by volume of the total volume of all three liquids at 20° C.

4. A wellbore fluid as claimed in claim 3, in which the oil:brine ratio by volume is in the range of from 95:5 to 50:50; and the concentration of the polar organic liquid is in the range of from 2% to 25% by volume of the total volume of all three liquids at 20° C.

5. A wellbore fluid as claimed in claim 1, in which the polar organic liquid is a polyalkylene glycol, an ester, a diol, or an ether.

6. A wellbore fluid as claimed in claim 1, in which the polar organic liquid is a compound comprising carbon, hydrogen and oxygen atoms only.

7. A wellbore fluid as claimed in claim 5, in which the polar organic liquid contains at least one ether link.

8. A wellbore fluid as claimed in claim 7, in which the polar organic liquid is a polyalkylene glycol whose molecular structure contains no alkyl groups having more than 5 carbon atoms.

9. A wellbore fluid as claimed in claim 7, in which the polar organic liquid is a copolymer of ethylene oxide and propylene oxide, or a polypropylene glycol having a number average molecular weight in the range of 200 to 600.

10. A wellbore fluid as claimed in claim 7, in which the polar organic liquid is a polytetrahydrofuran having a number average molecular weight in the range of 160 to 450.

11. A wellbore fluid as claimed in claim 5, in which the polar organic liquid is a dialkyl-ether of an oligo-ethylene glycol or a diester of an oligo ethylene glycol.

12. A wellbore fluid as claimed in claim 1, in which the brine phase of the wellbore fluid contains at least 10% by weight of a dissolved salt or mixture of salts.

13. A wellbore fluid as claimed in claim 12, in which the brine phase contains at least 15% by weight of a dissolved salt or mixture of salts.

14. A wellbore fluid as claimed in claim 1, in which the brine phase contains one or more salts selected from alkali metal halides; alkaline earth metal halides; sodium, potassium and caesium acetates and formates; and alkali metal carbonates, sulphates, phosphates, silicates and citrates.

15. A wellbore fluid as claimed in claim 1, in which the oil phase comprises crude oil; a hydrocarbon refined fraction from crude oil; a synthetic hydrocarbon; a dialkyl ether; an alkyl alkanoate ester; an acetal; a natural oil; or any mixture thereof.

16. A wellbore fluid as claimed in claim 1, which also comprises a bridging particulate material.

17. A wellbore fluid as claimed in claim 16, in which the bridging particulate material comprises particles of melamine, lithium carbonate, magnesium sulfite or lithium phosphate.

18. A method of carrying out a wellbore operation, which includes the steps of:
  (a) introducing into a wellbore an oil-based wellbore fluid comprising a continuous phase comprising an oil and, dispersed therein, a first dispersed liquid phase and a second separate dispersed liquid phase, the first dispersed liquid phase being a brine phase containing at least 5% by weight of a dissolved salt or a mixture of salts, and the second dispersed liquid phase comprising a polar organic liquid, said polar organic liquid being insoluble or sparingly soluble in the brine comprising said first dispersed liquid phase, but being soluble in pure water and additionally comprising at least one additive selected from the group consisting of clays, filtration reducers, weighting agents, bridging particles, and suspended salt particles such that a filter-cake forms on the wellbore wall or in conduits in a rock formation that is penetrated by the wellbore; and subsequently
  (b) allowing a further fluid to come into contact with the filter-cake, said further fluid having a level of salinity which is lower than the level of salinity of said first dispersed liquid phase, and being such that said polar organic liquid is soluble therein, in which said second dispersed liquid phase is in the form of droplets having an average diameter of not less than 5 microns.

19. A method as claimed in claim 18, in which the wellbore fluid is the polar organic liquid has a solubility of greater than 20% by weight in a synthetic seawater at 20° C. wherein the synthetic seawater contains 3.5% by weight dissolved salts; a solubility of less than 10% by weight in a 10% w/w aqueous NaCl solution at 50° C. or less than 10% by weight in a 20% w/w $CaCl_2$ aqueous solution at 50° C.; and a solubility of less than 5% by weight in n-tetradecane at 40° C. in the presence of at least 2% by weight of water.

20. A method as claimed in claim 18, in which the further fluid is produced water from a gas well or an oil well, an aqueous liquid that is pumped into an injection well for reservoir pressure maintenance, or an aqueous wash fluid pumped into the well.

21. A method as claimed in claim 18, in which the concentration of salt(s) in the brine phase of the wellbore fluid is at least twice the concentration of salt(s) in the further fluid.

22. A method as claimed in claim 18, in which the further fluid is a brine having a total dissolved salts content of less than 5% by weight.

23. A method as claimed in claim 22, in which the further fluid is seawater.

* * * * *